(No Model.) 2 Sheets—Sheet 1.

H. D. & E. L. WILSON.
COTTON PLANTER AND GUANO DISTRIBUTER.

No. 323,995. Patented Aug. 11, 1885.

WITNESSES:
J. H. Blackwood
Rhesa G. DuBois

INVENTORS
Henry D. Wilson
Eugene L. Wilson
BY
M. H. Doolittle
ATTORNEY (No Model.) 2 Sheets—Sheet 2.
H. D. & E. L. WILSON.
COTTON PLANTER AND GUANO DISTRIBUTER.
No. 323,995. Patented Aug. 11, 1885.
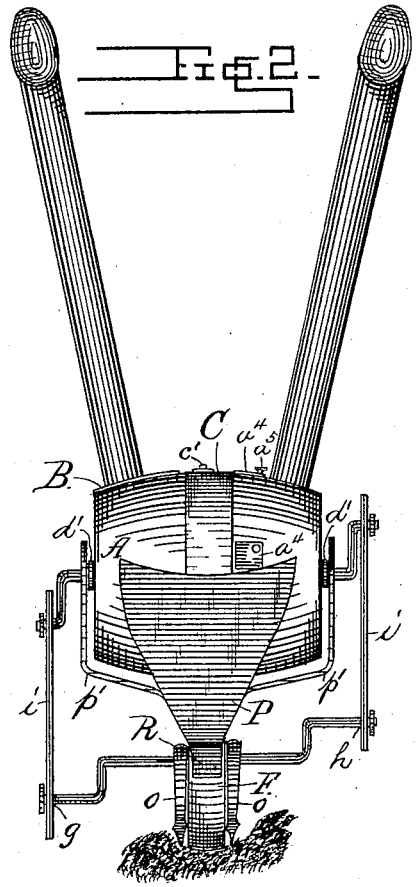
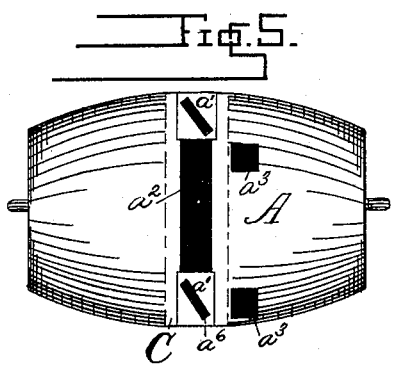
WITNESSES:
J. H. Blackwood
R. G. DuBois
INVENTORS
Henry D. Wilson
Eugene L. Wilson
BY
W. B. Doolittle
ATTORNEY

UNITED STATES PATENT OFFICE.

HENRY D. WILSON AND EUGENE L. WILSON, OF ABBEVILLE, S. C.

COTTON-PLANTER AND GUANO-DISTRIBUTER.

SPECIFICATION forming part of Letters Patent No. 323,995, dated August 11, 1885.

Application filed October 17, 1884. (No model.)

*To all whom it may concern:*

Be it known that we, HENRY D. WILSON and EUGENE L. WILSON, citizens of the United States, residing at Abbeville, in the county of Abbeville and State of South Carolina, have invented certain new and useful Improvements in Combined Cotton-Planter and Guano-Distributer; and we do hereby declare the following to be a full, clear, and exact description of the invention, such as will enable others skilled in the art to which it appertains to make and use the same.

Our invention relates to a combined cotton-planter and guano-distributer; and it consists of improvements in the construction and operation of the seed or guano dropper and in the manner of connecting the same with a furrow and covering plows.

Figure 1:
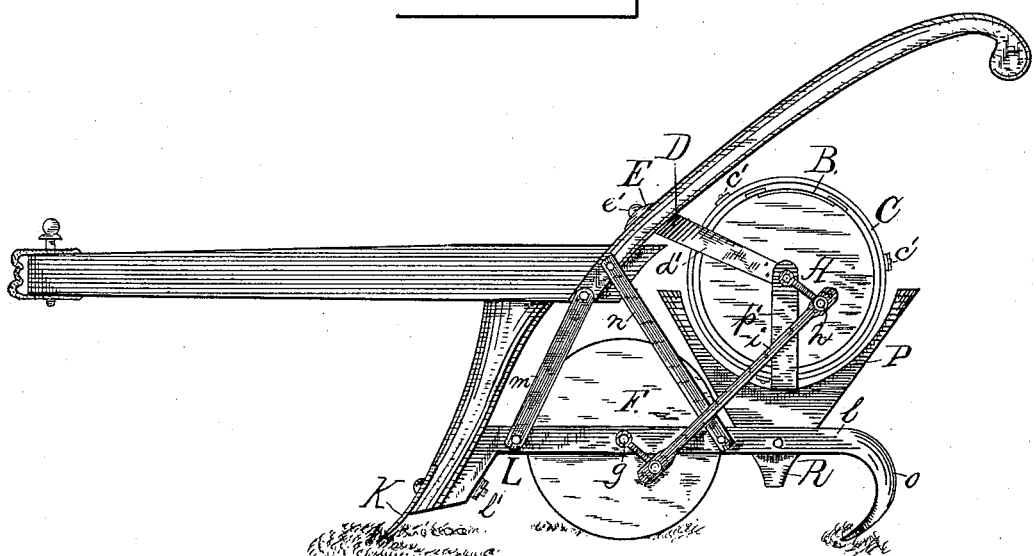
Figure 3:
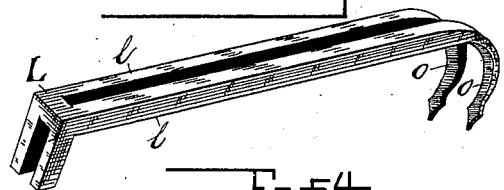
Figure 4:
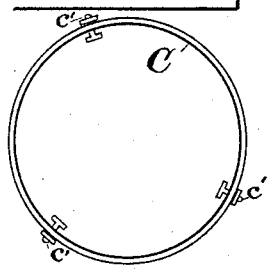

Our invention is illustrated in the accompanying drawings, in which Figure 1 is a side view in elevation; Fig. 2, a rear end elevation; and Figs. 3, 4, and 5, views of detached portions of the apparatus.

In the drawings, A is a barrel-shaped cylinder for containing the cotton-seed or guano, and consists of two parts held together at the center by three narrow strips, $a'$, which are set into mortises at the opposite edges of the two parts of the barrel, so that their upper surfaces will be flush with the outer surface of the barrel. By means of these strips the two parts of the barrel are held sufficiently far apart to form central slots or openings, $a^2$, through which the seed or guano passes out. The barrel is also provided with holes $a^3$, arranged at proper intervals for dropping the seed in hills when it is desired to plant them in that way. These holes are separate from the central slotted part, and are covered when not in use by covers $a^4$, each of which is held in place by means of a thumb-screw, $a^5$. When the holes are to be used, the thumb-screws are loosened, the covers turned to one side, and the screws then tightened to hold the covers in place.

B is a slide-door through which the seed and guano are put into the barrel. To regulate and control the escape of the seed and guano from the barrel we employ an adjustable band, C, which is adapted to slip over the barrel and cover the central strips and slots $a'$ $a^2$. This band is adjusted laterally at any desired point over the openings for the escape of the seed and guano by means of set screws $c'$, operating in diagonal slots $a^6$, formed in the central stripes, $a'$.

The barrel is supported by and connected to the plow by means of a bracket, D, having arms $d'$, between which the barrel is placed. This bracket D is secured to a plate, E, attached to the plow-handles by means of a screw-bolt, $e'$.

The barrel is rotated by a wheel, F, both barrel and wheel being provided, respectively, with crank-axles $g$ and $h$, which are connected by crank-arms $i$ $i$. The wheel F runs in the furrow made by the plow-point K, and it is supported on its axle between the arms $l$ $l$ of a frame, L, which frame is bolted to the foot of the plow, as shown at $l'$. This frame L is further secured to the plow by means of braces $m$ $m$ $n$ $n$, running up from the arms $l$ to the plow-handles. The outer ends of the arms $l$ $l$ are provided with covering-blades $o$ $o$, attached to the bracket D. Two metal braces may be provided, running from the bracket to the back part of the arms $l$ $l$, by which additional steadiness is given to the barrel, and the cranks are prevented from getting out of plumb.

P is a hopper extending partly around and beneath the central portion of the barrel and held in place by braces or arms $p'$, extending from both sides of the hopper to the arms $d'$ of bracket D, which support the barrel. The hopper is also provided with a seed-spout, R, which extends down between the arms $l$ $l$ of the frame L and discharges the seed or guano into the furrow directly behind the wheel F. The operation of the planter and fertilizer-distributer will be readily seen without further description.

Our invention is adapted to be used with any kind of plow-stock, and by our improvements we are enabled to dispense with quite a number of parts which have heretofore been generally employed in machines of this character, whereby the planter and distributer is rendered more simple and less expensive in construction and more durable and efficient in operation.

What we claim is—

1. In a planter and distributer, the cylinder A, constructed as described, provided with the central seed or guano openings, and the additional apertures $a^3$, for dropping the seed in hills, having covers $a^4$, in combination with adjustable band C, the furrow-wheel F, and the crank-axles by which the cylinder is rotated, the hopper, the bracket D, provided with the arms and braces by which both the cylinder and the hopper are supported, and the frame provided with the covering-plows, substantially as described.

2. In a planter and distributer, the fertilizer and seed containing cylinder provided with the separate apertures $a^3$ and their adjustable covers, for the discharge of the seed in hills, substantially as described.

In testimony whereof we affix our signatures in presence of two witnesses.

HENRY D. WILSON.
EUGENE L. WILSON.

Witnesses:
M. G. ZEIGLER,
H. D. REESE.